United States Patent [19]
Monahan

[11] Patent Number: 5,479,742
[45] Date of Patent: Jan. 2, 1996

[54] PLANTER BOX

[76] Inventor: Joseph J. Monahan, P.O. Box 284 3 Heritage Ln., S. Lancaster, Mass. 01561

[21] Appl. No.: 288,091

[22] Filed: Aug. 9, 1994

[51] Int. Cl.⁶ ..................................................... A01G 9/02
[52] U.S. Cl. ................................. 47/66; 47/68; 220/4.33
[58] Field of Search ..................................... 47/665 C, 68;
217/12 R, 13, 65; 220/4.33, 692, 693

[56] References Cited

U.S. PATENT DOCUMENTS

| | | | |
|---|---|---|---|
| 997,755 | 7/1911 | Caghe | 217/12 R |
| 1,952,360 | 3/1934 | Brown | 217/12 R |
| 2,072,395 | 3/1937 | Dodson | 47/66 S C |
| 3,989,156 | 11/1976 | Lowry | 217/12 R |
| 4,120,119 | 10/1978 | Engel | 47/66 S C |
| 4,828,894 | 5/1984 | Taylor | 47/66 S C |

FOREIGN PATENT DOCUMENTS

| | | | |
|---|---|---|---|
| 947854 | 7/1949 | France | 217/12 R |
| 2402403 | 5/1979 | France | 47/66 S C |
| 9346 | 7/1889 | United Kingdom | 217/12 R |
| 549357 | 11/1942 | United Kingdom | 217/12 R |
| 723046 | 2/1955 | United Kingdom | 217/12 R |

Primary Examiner—Henry E. Raduazo
Attorney, Agent, or Firm—John E. Toupal; Harold G. Jarcho

[57] ABSTRACT

A pair of end caps for a planter box having first and second side walls and a bottom wall, each end cap defining a first support surface having a generally vertical orientation and arranged to engage a marginal face portion at one end of the first side wall; and a second support surface having a generally vertical orientation, horizontally spaced from and facing the first support surface and arranged to engage a marginal face portion at one end of the second side wall. A plurality of holes are vertically spaced apart and intersect the first support surface, and a plurality of openings are vertically spaced apart and intersect the second support surface. The holes receive securing members that penetrate the marginal face portion at one end of the first side wall and the openings receive securing members that penetrate the marginal face portion at one end of the second side wall.

18 Claims, 2 Drawing Sheets

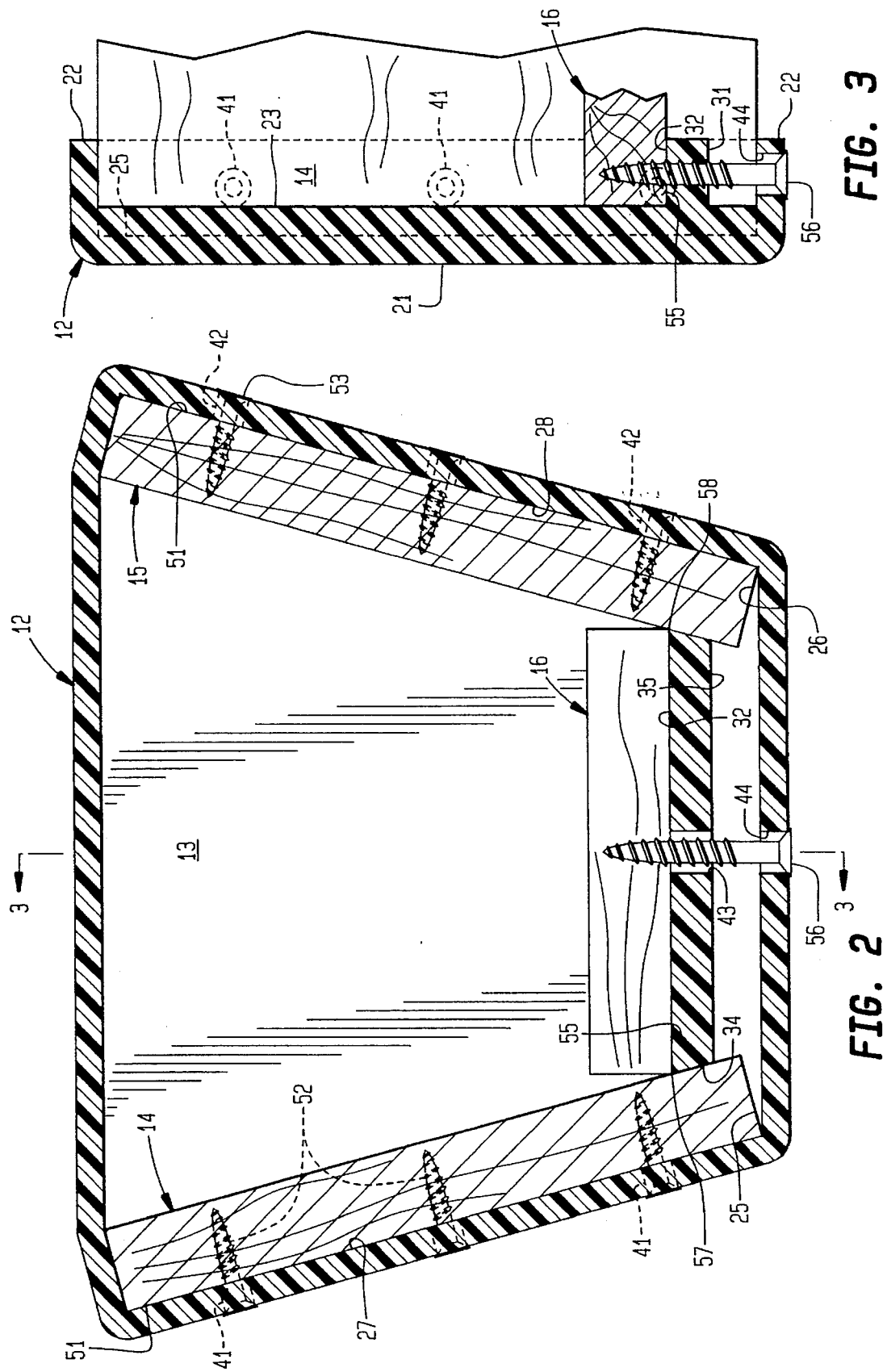

PLANTER BOX

BACKGROUND OF THE INVENTION

This invention relates generally to planter boxes and, more particularly, to end caps for use in constructing planter boxes.

In both inside and outside applications, planter boxes are used extensively to grow a wide variety of plants including flowers, vegetables, herbs, etc. Planter boxes commonly are constructed with planks of wooden material such as redwood having an inherent resistance to moisture induced deterioration. Typically, such boxes are sold in nurseries and garden departments of retail stores.

U.S. Pat. No. 3,955,320 discloses a planter box formed of morticed wooden planks that can be assembled either before or after being shipped to a point of distribution. Although the structural integrity of a planter box is enhanced by the use of morticed joints, they add significantly to manufacturing cost. In addition to undesirable high cost, morticed wooden planter boxes suffer from the inherent disadvantage of limiting from a practical standpoint the variety of box sizes that can be maintained in inventory.

The object of this invention, therefore, is to provide a rugged planter box that can be conveniently offered in a wide variety of sizes and at reasonable cost.

SUMMARY OF THE INVENTION

The invention encompasses a pair of end caps for a planter box having first and second side walls and a bottom wall, each end cap defining a first support surface having a generally vertical orientation and arranged to engage a marginal face portion at one end of the first side wall; and a second support surface having a generally vertical orientation, horizontally spaced from and facing the first support surface and arranged to engage a marginal face portion at one end of the second side wall. A plurality of holes are vertically spaced apart and intersect the first support surface, and a plurality of openings are vertically spaced apart and intersect the second support surface. The holes receive securing members that penetrate the marginal face portion at one end of the first side wall and the openings receive securing members that penetrate the marginal face portion at one end of the second side wall.

According to one feature of the invention, each end cap further defines a first groove at least partially defining the first support surface and shaped to receive the one end of the first side wall, and a second groove at least partially defining the second support surface and shaped to receive the one end of the second side wall. The grooves function to retain the first and second side walls.

According to another feature of the invention, each end cap further defines a substantially horizontal third support surface disposed between the first support surface and the second support surface. The third support surface is arranged to support a marginal face portion at one end of the bottom wall.

According to a further feature of the invention, each of the first and second grooves slopes downwardly and inwardly. The sloping grooves provide the box with a truncated shape that enhances strength.

According to yet another feature of the invention, each end cap further defines at least one opening intersecting the third support surface. The additional opening receives a securing member that penetrates the marginal face portion at one end of the bottom wall.

According to additional features of the invention, each of the end caps have flange portions projecting inwardly from edge portions thereof. The flange portions increase the structural integrity of the box.

According to further features of the invention, each third support surface is formed by a shelf portion having sloping opposite edges substantially parallel to, respectively, said first and second support surfaces. The opposite edges engage and further retain the first and second side walls.

According to an additional feature of the invention, each of the end caps is a molded plastic unit. Molding of the end caps minimizes cost of the planter box.

DESCRIPTION OF THE DRAWINGS

These and other objects and features of the invention will become more apparent upon a perusal of the following description taken in conjunction with the accompanying drawings wherein:

FIG. 2 is a cross sectional view taken along lines 2—2 of FIG. 1; and

FIG. 3 is a partial sectional view taken along lines 3—3 of FIG. 2.

DESCRIPTION OF THE PREFERRED EMBODIMENT

Figure 1:
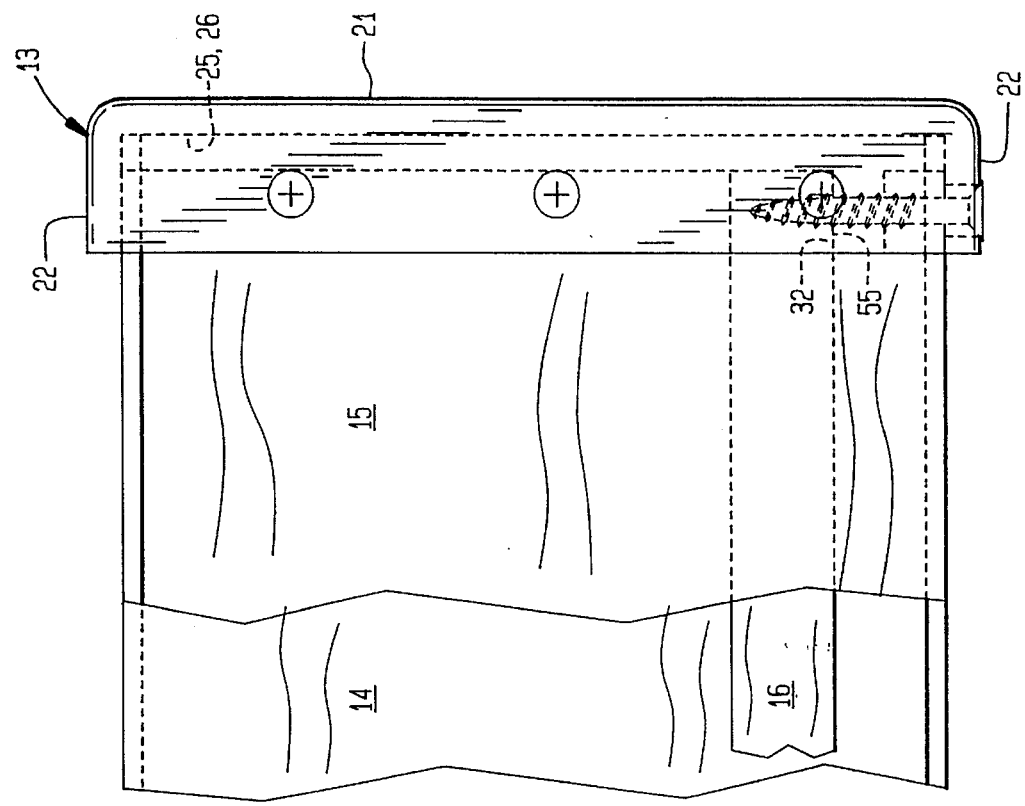
FIG. 1 is a broken away elevational view of a planter box according to the invention.
Figure 1:
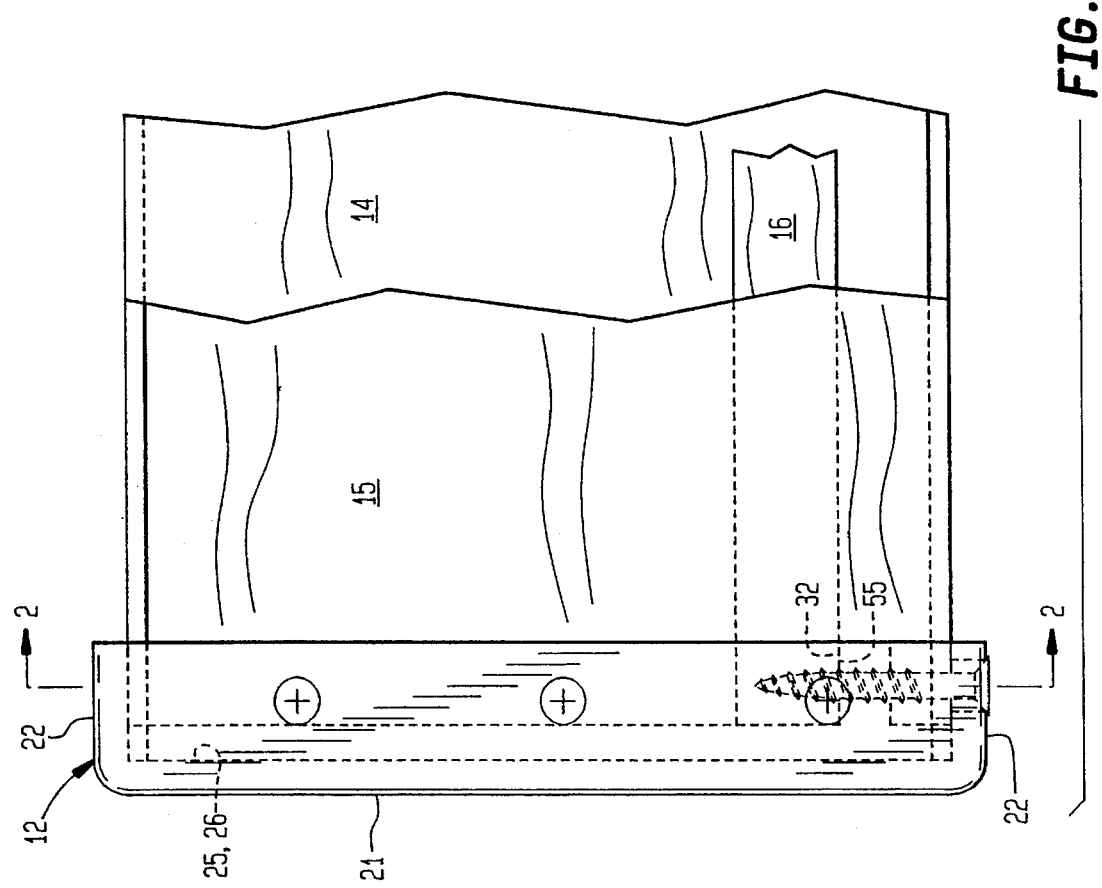

A planter box 11 is constructed with a pair of identical end caps 12, 13, a pair of end walls 14, 15 and a bottom wall 16. As shown in FIG. 1, opposite ends of the end walls 14, 15 and the bottom wall 16 are retained by, respectively, the end caps 12, 13. Preferably, each of the end caps 12, 13 is a molded plastic unit and the side walls 14, 15 and bottom wall 16 are elongated planks formed of a suitable wood.

As shown in FIG. 2, the end cap 12, which is identical to the end cap 13, has a planar outer surface 21 with the general shape of a trapezoid. Flange portions 22 project inwardly from the outer edges of the outer surface 21. Within the perimeter provided by the flange portions 22 is an inner surface 23 defining a first groove 25 that extends downwardly and inwardly between top and bottom portions of the end cap 12 directly adjacent to one lateral edge thereof. Also defined by the inner surface 23 is a second groove 26 that extends downwardly and inwardly between the top and bottom portions of the end cap 12 adjacent to an opposite lateral edge thereof.

An outer wall of the first groove 25 forms a generally vertical first support surface 27 that slopes slightly downwardly and inwardly. Similarly formed by an outer wall of the second groove is a generally vertical second support surface 28 facing the first support surface 27 and sloping slightly downwardly and inwardly. Projecting inwardly from the lower portion of the inner surface 23 between the first and second support surfaces 27, 28 is a shelf portion 31 that forms an upwardly directed, horizontal third support surface 32. Sloping opposite edges 34, 35 of the shelf portion 31 are parallel to, respectively, the first support surface 27 and the second support surface 28.

Formed in the flange portion 22 adjacent one vertical edge of the end cap 12 are a plurality of vertically spaced apart holes 41 that intersect the first support surface 27. Similarly formed in the flange portion 22 adjacent an opposite vertical edge of the end cap 12 are a plurality of vertically spaced openings 42 that intersect the second support surface 28.

Another opening 43 extends through a central part of the shelf portion 31 and intersects the third support surface 32. Aligned with the opening 43 is an opening 44 extending through the flange portion 22 at the bottom of the end cap 12.

Prior to assembly of the planter box 11, planks of any desired identical length are selected for the side walls 14, 15 and bottom wall 16. The selected side wall planks 14, 15 will have a board size, for example 1×6 inches, that will be accommodated by the grooves 25, 26. One end of the first side wall plank 14 is placed into the first groove 25 of the end caps 12. That produces engagement between a marginal face portion 51 at the one end of the first side wall plank 14 and the first support surface 27. Next, the first side wall plank 14 is secured in position within the groove 25 by insertion through the holes 41 of securement members such as screws 52 that penetrate the marginal face portion 51. The opposite end of the first side wall plank then is secured in the same manner within the second groove 26 of the end cap 13. Screws 53 penetrate the openings 42 and the marginal face portion 51. Securement of the second side wall plank 15 to the end caps 12 and 13 is accomplished in the same way.

After assembly of ends of the first and second side wall planks 14, 15 into the end caps 12, 13, the bottom wall plank 16, having a length identical to the slightly shorter than the first and second side wall planks 14, 15, is positioned with opposite marginal face portions 52 resting on the third support surfaces 32 of the end caps 12, 13. Although, securement of the bottom wall plank 16 is not required, screws 56 can be inserted through the openings 43, 44 into penetrating engagement with the face portions 55 if desired.

In its assembled position, lower longitudinal edges 57, 58 of the bottom wall plank 16 engage, respectively, the first side wall plank 14 and the second side wall plank 15. The vertical support provided by that engagement eliminates between the screws 56 and the marginal face portions 55 of the bottom wall plank 16 any shear stress that would result from longitudinal deformation of the bottom wall plank 16 under the weight of soil filling the planter box 11.

Obviously, many modifications and variations of the present invention are possible in light of the above teachings. For example only, the grooves 25, 26 can be eliminated in which case bottom wall plank 16 can be equal in length to the side wall planks 14, 15. It is to be understood, therefore, that the invention can be practiced otherwise than as specifically described.

What is claimed is:

1. A planter box comprising:
a first side wall member;
a second side wall member;
a bottom wall member; and
a pair of end caps, each said end cap defining a first support surface sloping downwardly and inwardly and engaging a marginal face portion at one end of said first side wall member; a second support surface sloping downwardly and inwardly, horizontally spaced from and facing said first support surface, and engaging a marginal face portion at one end of said second side wall member; and wherein said bottom wall member has a first longitudinal edge extending between said end caps and supported by said first side wall member and a second longitudinal edge extending between said end caps and supported by said second side wall member.

2. A planter box according to claim 1 wherein each said end cap further defines a first groove at least partially defining said first support surface and shaped to receive the one end of said first side wall member, and a second groove at least partially defining said second support surface and shaped to receive said one end of said second side wall member.

3. A planter box according to claim 2 wherein each said end cap further defines a substantially horizontal third support surface disposed between said first support surface and said second support surface and supporting a marginal face portion at one end of said bottom wall member.

4. A planter box according to claim 3 wherein each of said first and second grooves slopes downwardly and inwardly.

5. A planter box according to claim 4 wherein each said end cap further defines at least one opening intersecting said third support surface and adapted to receive a securing member penetrating the marginal face portion at one end of said bottom wall member.

6. A planter box according to claim 5 wherein each of said end caps has flange portions projecting inwardly from edge portions thereof.

7. A planter box according to claim 5 wherein said third support surface is formed by a shelf portion having sloping opposite edges substantially parallel to, respectively, said first and second support surfaces.

8. A planter box according to claim 1 wherein each of said end caps is a molded plastic unit.

9. A planter box according to claim 8 wherein each said end cap further defines a first groove at least partially defining said first support surface and shaped to receive the one end of said first side wall member, and a second groove at least partially defining said second support surface and shaped to receive said one end of said second side wall member.

10. A planter box according to claim 9 wherein each said end cap further defines a substantially horizontal third support surface disposed between said first support surface and said second support surface and adapted to support a marginal face portion at one end of said bottom wall member.

11. A planter box according to claim 10 wherein each of said first and second grooves slopes downwardly and inwardly.

12. A planter box according to claim 11 wherein each said end cap further defines at least one opening intersecting said third support surface and adapted to receive a securing member penetrating the marginal face portion at one end of said bottom wall member.

13. A planter box according to claim 12 wherein said third support surface is formed by a shelf portion having sloping opposite edges substantially parallel to, respectively, said first and second support surfaces.

14. A planter box according to claim 13 wherein each of said end caps has flange portions projecting inwardly from edge portions thereof.

15. A planter box according to claim 1 wherein each said end cap further defines a plurality of holes vertically spaced apart and intersecting said first support surface, said holes adapted to receive securing members penetrating the marginal face portion at one end of said first side wall member; and a plurality of openings vertically spaced apart and intersecting said second support surface, said openings adapted to receive securing members penetrating the marginal face portion at one end of said second side wall member.

16. A planter box according to claim 15 wherein each said end cap further defines a first groove at least partially defining said first support surface and shaped to closely receive the one end of said first side wall member, and a second groove at least partially defining said second support surface and shaped to closely receive the one end of said second side wall member.

17. A planter box according to claim 16 wherein each of said end caps has flange portions projecting inwardly from edge portions thereof.

18. A planter box according to claim 15 wherein each of said end caps is a molded plastic unit.

* * * * *